US010540620B2

(12) United States Patent
Torres et al.

(10) Patent No.: US 10,540,620 B2
(45) Date of Patent: Jan. 21, 2020

(54) PERSONALIZED AGGREGATED PROJECT TEAM ACTIVITY FEED

(71) Applicant: Microsoft Technology Licensing, LLC, Redmond, WA (US)

(72) Inventors: Melissa Torres, Redmond, WA (US); John DeMaris, Seattle, WA (US); Janet Longhurst, Bellevue, WA (US); Yimin Wu, Redmond, WA (US); Jeremy Mazner, Redmond, WA (US); Dmitriy Meyerzon, Bellevue, WA (US); Nicholas Anthony Buelich, II, Bellevue, WA (US); Nikita Voronkov, Bothell, WA (US); Adam Ford, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 299 days.

(21) Appl. No.: 15/605,926

(22) Filed: May 25, 2017

(65) Prior Publication Data

US 2018/0121849 A1   May 3, 2018

Related U.S. Application Data

(60) Provisional application No. 62/415,453, filed on Oct. 31, 2016.

(51) Int. Cl.
*G06Q 10/06* (2012.01)
*G06Q 50/00* (2012.01)

(52) U.S. Cl.
CPC ....... *G06Q 10/06313* (2013.01); *G06Q 50/01* (2013.01)

(58) Field of Classification Search
CPC .... G06Q 10/101; G06Q 10/10; G06Q 10/103; G06Q 10/063114; G06Q 50/01
See application file for complete search history.

(56) References Cited

U.S. PATENT DOCUMENTS 6,321,252 B1 * 11/2001 Bhola ............... H04N 7/15
348/E7.083
7,827,208 B2   11/2010 Bosworth et al.
(Continued)

FOREIGN PATENT DOCUMENTS

WO   2008113425 A1   9/2008
WO   2013070815 A1   5/2013

OTHER PUBLICATIONS

Melody Karmer, et al., 64 Ways to Think About a News Homepage Medium.com, Mar. 2015, Retrieved from Archive.org May 15, 2019 (Year: 2015).*

(Continued)

*Primary Examiner* — Scott L Jarrett
(74) *Attorney, Agent, or Firm* — Schwegman Lundberg & Woessner, P.A.

(57) ABSTRACT

In one example, an activity feed server may describe events in a project by collecting events from across multiple services into an activity feed personalized to the user. The activity feed server may store an event set describing activities related to the project. The activity feed server may rank a mature event set from the event set of events older than a period matching a processing delay based on a relevance weighting for a user to generate a curated event list. The activity feed server may queue a recent event set of events younger than the processing delay in chronological order to generate a recent event list. The activity feed server may generate an event list having the curated event list and the recent event list. The activity feed server may send the activity feed having the event list to a client device for presentation to the user.

20 Claims, 9 Drawing Sheets

(56) References Cited

U.S. PATENT DOCUMENTS

| | | | |
|---|---|---|---|
| 7,991,764 B2* | 8/2011 | Rathod | G06Q 10/00 707/713 |
| 8,065,383 B2 | 11/2011 | Carlson et al. | |
| 8,321,361 B1* | 11/2012 | Heath | G06Q 10/10 706/45 |
| 8,380,710 B1* | 2/2013 | Finne | G06F 16/24578 707/723 |
| 8,463,795 B2* | 6/2013 | van Hoff | G06F 16/3322 707/748 |
| 8,549,047 B2* | 10/2013 | Beechuk | G06Q 50/01 707/803 |
| 8,666,993 B2* | 3/2014 | Chunilal | G06Q 10/107 707/749 |
| 8,812,510 B2* | 8/2014 | Romanov | G11B 27/034 707/746 |
| 8,819,564 B1* | 8/2014 | Heath | G06F 3/048 235/386 |
| 8,832,301 B2* | 9/2014 | Graff | G06Q 10/1093 709/231 |
| 9,049,259 B2* | 6/2015 | Rathod | H04N 21/44222 |
| 9,189,480 B2* | 11/2015 | Thiruvidan | G06F 16/93 |
| 9,269,081 B1* | 2/2016 | Panzer | G06Q 50/01 |
| 9,317,390 B2 | 4/2016 | Chisa et al. | |
| 9,385,979 B1* | 7/2016 | Chung | H04L 51/066 |
| 9,391,792 B2* | 7/2016 | Yeskel | H04L 12/1895 |
| 9,465,505 B1* | 10/2016 | Moody | G06F 3/048 |
| 9,569,478 B2* | 2/2017 | Kemp | G06F 9/5072 |
| 9,614,880 B1* | 4/2017 | Davis | H04L 65/403 |
| 9,692,675 B1* | 6/2017 | Van Rotterdam | H04L 67/02 |
| 9,979,777 B1* | 5/2018 | Tomkins | G06F 12/06 |
| 10,109,021 B2* | 10/2018 | Brooks | G06Q 50/01 |
| 10,333,881 B2* | 6/2019 | Edgar | H04L 51/26 |
| 2008/0229214 A1* | 9/2008 | Hamilton | H04L 67/22 715/751 |
| 2009/0217175 A1* | 8/2009 | Bechtel | G06F 16/34 715/751 |
| 2009/0222527 A1* | 9/2009 | Arconati | G06F 21/31 709/206 |
| 2009/0265430 A1* | 10/2009 | Bechtel | G06Q 10/10 709/205 |
| 2010/0011072 A1* | 1/2010 | Mishchenko | G06Q 10/10 709/206 |
| 2010/0057682 A1* | 3/2010 | Ramsay, Jr. | G06Q 10/10 707/E17.014 |
| 2010/0063969 A1 | 3/2010 | Kasargod et al. | |
| 2010/0235505 A1* | 9/2010 | Gupta | G06Q 10/107 709/225 |
| 2011/0276396 A1* | 11/2011 | Rathod | G06Q 10/00 705/14.49 |
| 2012/0110458 A1* | 5/2012 | Brown | G06F 16/27 715/733 |
| 2012/0296919 A1 | 11/2012 | Sinha et al. | |
| 2013/0103757 A1* | 4/2013 | Mitchell | G06Q 50/01 709/204 |
| 2013/0147971 A1* | 6/2013 | Flynn, III | H04N 5/225 348/207.1 |
| 2013/0151987 A1* | 6/2013 | Flynn, III | G06F 3/0488 715/753 |
| 2013/0254699 A1* | 9/2013 | Bashir | G06F 3/0481 715/772 |
| 2013/0332861 A1* | 12/2013 | D'Agnese | G06Q 10/103 715/753 |
| 2014/0013247 A1 | 1/2014 | Beechuk et al. | |
| 2014/0040029 A1* | 2/2014 | Vhora | H04L 67/22 705/14.54 |
| 2014/0082525 A1* | 3/2014 | Kass | H04L 65/403 715/753 |
| 2014/0129639 A1* | 5/2014 | Burge | H04L 51/32 709/204 |
| 2014/0129942 A1* | 5/2014 | Rathod | H04N 21/44222 715/720 |
| 2014/0215349 A1* | 7/2014 | Kosslyn | G06F 16/9535 715/745 |
| 2014/0243098 A1 | 8/2014 | Yong et al. | |
| 2014/0298207 A1* | 10/2014 | Ittah | G06Q 10/00 715/753 |
| 2014/0344112 A1 | 11/2014 | Smedberg et al. | |
| 2014/0372539 A1* | 12/2014 | Zaveri | H04L 51/046 709/206 |
| 2015/0033153 A1* | 1/2015 | Knysz | G06Q 50/01 715/753 |
| 2015/0058324 A1 | 2/2015 | Kauwe | |
| 2015/0112990 A1 | 4/2015 | van Os et al. | |
| 2015/0134746 A1* | 5/2015 | Offenhartz | H04L 67/306 709/205 |
| 2015/0193521 A1* | 7/2015 | Schoeffler | G06F 16/285 707/737 |
| 2015/0248480 A1 | 9/2015 | Miller et al. | |
| 2015/0262069 A1* | 9/2015 | Gabriel | G06F 16/9535 706/48 |
| 2015/0302338 A1* | 10/2015 | Zaveri | H04L 51/32 705/7.39 |
| 2016/0357355 A1* | 12/2016 | Carrigan | G06F 3/0481 |
| 2016/0371626 A1* | 12/2016 | Ali | G06Q 10/06311 |
| 2017/0236086 A1* | 8/2017 | Simon | G06Q 10/06375 705/7.37 |
| 2017/0364588 A1* | 12/2017 | Bastide | H04L 51/32 |
| 2018/0060770 A1* | 3/2018 | Meyerzon | G06Q 10/0631 |

OTHER PUBLICATIONS

Niiranen, Jukka, Activity Feeds in R8: from follow to filter Survivingcm.com, May 30, 2012 (Year: 2012).*

Schwartzman, Eric, Activity Streams Will Change Your Business OnTheRecordPodCast.com, May 3, 2010 (Year: 2010).*

Berkovsky, Shlomo et al., Personalized social network activity feeds for increased interaction and content contribution Frontiers in Robotics and AI, vol. 2, Article 24, Oct. 2015 (Year: 2015).*

Guy I. et al, Finger on the Pulse: The Value of the Activity Stream in the EnterpriseINTERACT 2013. Lecture Notes in Computer Science, vol. 8120. (Year: 2013).*

Stump, Joe, How an Activity Feed helps your organization Sprint.ly, Oct. 1, 2014 (Year: 2014).*

Eisenhauer, Tim, Improve Communication at Work with Communifire's Activity Stream: An In-Depth Look Twitter.com, Oct. 27, 2015 (Year: 2015).*

Cunnigham, Katelan, The Essential Guide to Building an Activity Stream into Your App Thinkapps.com, Sep. 16, 2015 (Year: 2015).*

Kajaruban, et al., "Real Time Personalized Aggregated Activity Stream for an Organization", In Proceedings of the 18th Annual Research Symposium, Mar. 21, 2014, 2 pages.

Guy, et al., "Personalized Activity Streams: Sifting Through the "River of News"", In Proceedings of the Fifth ACM Conference on Recommender Systems, Oct. 23, 2011, 8 pages.

Agarwal, et al., "Personalizing LinkedIn Feed", In Proceedings of the 21th ACM SIGKDD International Conference on Knowledge Discovery and Data Mining, Aug. 11, 2015, pp. 1651-1660.

* cited by examiner

Figure 5

| USER ID 510 | POSITION 520 | REPORT 530 | PROJECT 540 | FILE HISTORY 550 |
|---|---|---|---|---|
| | | | | FILE 552 / TIME 554 / TYPE 556 |

| DOCUMENT ID 610 | GROUP ID 620 | SUBJECT VECTOR 630 | AUTHOR 640 | EDIT ARRAY 650 | VIEW 660 |
|---|---|---|---|---|---|
| | | | TIME 642 | EDIT ID 652 / EDITOR 654 / TIME 656 | VIEWER 662 / TIME 664 |

600

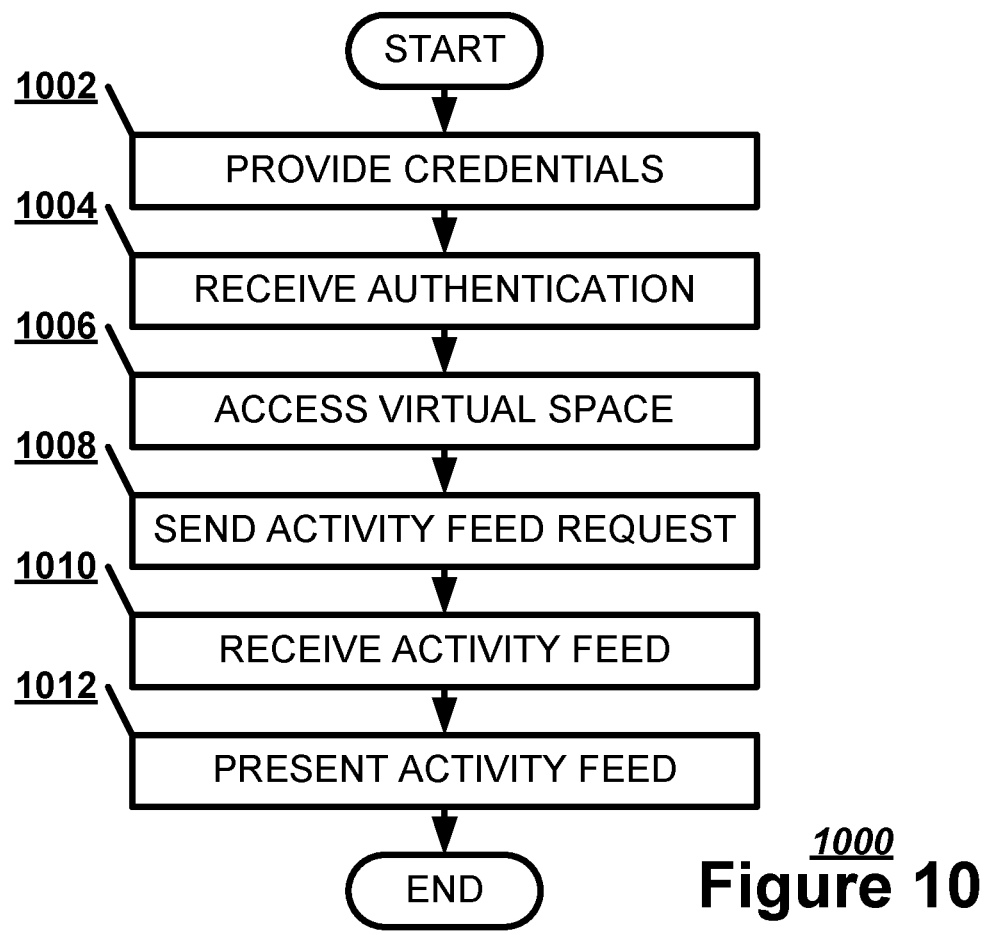

PERSONALIZED AGGREGATED PROJECT TEAM ACTIVITY FEED

PRIORITY INFORMATION

This application claims priority from U.S. Provisional Patent Application Ser. No. 62/415,453, filed Oct. 31, 2016, the contents of which are incorporated herein by reference in its entirety.

BACKGROUND

A worker on a project may use a collaboration virtual space to cooperate with other workers in developing files in furtherance of the project. The collaboration virtual space may be a website or a virtual location accessible by a dedicated application. The worker may create and store files for the project at the virtual collaboration space to allow easier access across devices and to open access of the files to other workers. The worker may access other files that other workers have provided to the virtual collaboration space for purposes of reviewing and editing the files.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Examples discussed below relate to describing activities in a project by collecting events from across multiple services into an activity feed personalized to the user. The activity feed server may store an event set describing activities related to the project. The activity feed server may rank a mature event set from the event set of events older than a period matching a processing delay based on a relevance weighting for a user to generate a curated event list. The activity feed server may queue a recent event set of events younger than the processing delay in chronological order to generate a recent event list. The activity feed server may generate an event list having the curated event list and the recent event list. The activity feed server may send the activity feed having the event list to a client device for presentation to the user.

DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

FIG. 5 illustrates, in a block diagram, one example of a user profile.

FIG. 6 illustrates, in a block diagram, one example of a file metadata profile.

FIG. 10 illustrates, in a flowchart, one example of a method for presenting an activity feed at the client device.

DETAILED DESCRIPTION

Figure 1:
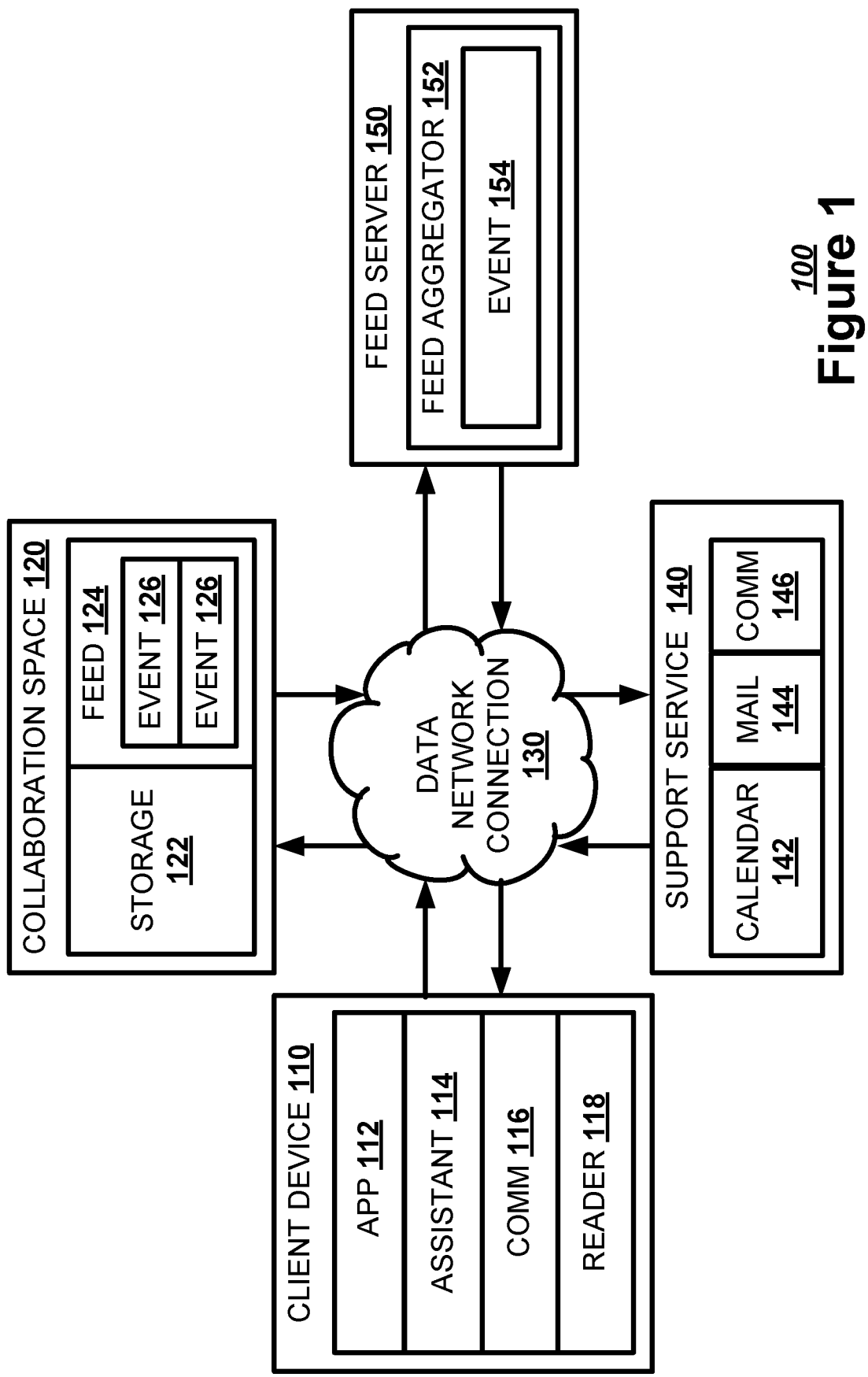
FIG. 1 illustrates, in a block diagram, one example of a data network.

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be an activity feed server, a computing device, or a machine-implemented method.

In one example, an activity feed server may describe events in a project by collecting events from across multiple services into an activity feed personalized to the user. The activity feed server may store an event set describing activities related to the project. The activity feed server may rank a mature event set from the event set of events older than a period matching a processing delay based on a relevance weighting for a user to generate a curated event list. The activity feed server may queue a recent event set of events younger than the processing delay in chronological order to generate a recent event list. The activity feed server may generate an event list having the curated event list and the recent event list. The activity feed server may send the activity feed having the event list to a client device for presentation to the user.

Collaborative solutions may provision resources across multiple services to provide a diverse set of functionalities for people working together on projects. For example, an Office 365® group may contain an email inbox for mails; a SharePoint® site for pages, documents, and lists; and a calendar for shared events. Users may visit each of these services in the context of the group to access objects relevant to that group. A collaboration service may have a single point of aggregation so people may visit one place to see objects that are recently active across each of these services. Thus, the user may quickly determine the objects that people in the group have been recently working on, such as emails, tasks, files, list items, or any other objects across the different group resources.

A separate service may aggregate activities performed by group members in the context of a group, within each of the provisioned resource locations for the group. A single page, such as the homepage of a team site, may show an aggregated activity feed of recently active objects, such as files, mails, calendar items, and list items. The activity feed may identify a worker who recently has acted on an object and the action performed, such as start a file, publish a file, or respond to a comment on a file. The activity feed may rank objects in chronological order, starting with objects acted upon most recently, and ending with objects acted upon least recently.

Alternately, an activity feed provider may personalize the activity feed for each member of the group. The activity feed provider may rank the objects in the feed in order of decreasing expected rate, or likelihood, of interaction. By focusing on the interaction rate, the activity feed provider may still promote the most recent activity items, but may further incorporate the volume of interactions, with different interaction types weighted differently. The activity feed provider may re-rank for an individual based on a role on the team, an expected task, or a relationship with other members of the team. For example, an email thread that contains a reply that specifically mentions a person may be ranked higher for that person and placed above items that may have been acted upon more recently. Another example, a file with an active workflow task assigned to a person may be ranked higher for that person when viewing the feed. The activity feed provider may provide precedence to items directly related to the user, then to items related to close colleagues of the user, followed by generally popular or recent items.

An activity feed server may collect events from multiple network services used in the development of a project. A network service may be any service that interacts with other computing devices across a network to perform a function. For example, a network service may be a mail application, a calendar application, a communication application, and other software. The activity feed server may build off of a virtual collaboration space to organize the events into project groups and generate events describing the events. A virtual collaboration space is a website or virtual location accessible by a dedicated application that allows a user to interact with other group members, either by posting project information or by storing one or more data files to act as a product of the project. A data file posted by the user may be accessed by other users for purposes of reviewing, editing, or incorporating into other data files.

An activity feed server may curate the activity feed to personalize the activity feed to the user. The activity feed server may apply an event weight to an event indicating preferred placement in the activity feed based on the event type. For example, the activity feed server may weight a change to the data file higher than a user viewing the file.

The activity feed server may assign an event weight based on many different actions. For example, the activity feed server may assign an event weight based on a user viewing or editing a document; a colleague editing a document the user authored previously; a user viewing a document previously authored by a colleague; a colleague viewing, sharing, or tagging documents the user authored previously; a colleague editing other documents on the site relevant to the user; a colleague editing other documents on the site where the user previously read multiple documents; new documents created on the site by others; trending documents; or other criteria.

Further, the activity feed server may determine a focus weight for a file describing a level of interaction between a user and a file. The focus weight may be a current focus weight describing current interactions between the user and file or a predicted focus weight predicting a probability of future interactions between the user and file. In the example of a current focus weight, the activity feed server may place a greater focus weight on a file the user has created than a file the user has merely edited.

The activity feed may use a popularity algorithm to curate events, with a higher focus weight given to those objects with which a user has directly interacted. For example, the activity feed server may use analytics to update the focus weight of an object, such as a document, as follows:

$$\lambda'_{ud} = \beta^\tau \lambda_{ud} + (1 - \beta^\tau) \sum_a v_a \frac{c_{aud}}{\tau},$$

where $\lambda_{ud}$ is the weight of relationship describing a rate of interaction between user u and document d, $\beta^\tau$ is the time decay factor describing the decrease in rate over time t, $v_a$ is the weight of the interaction, and $c_{aud}$ is the number of interactions of type a from user u to doc d in a given time t. With this approach, the activity feed server may downgrade older interactions with time while counting newer ones with a different focus weight depending on the interaction type. Thus, the activity feed server may update the existing weight with newer events. The activity feed server may use the event weight and the focus weight to determine the placement of an event in an event list, with presumably more important events or events for files that are more likely to be interacted with by the user being at the top of the list.

The curating process may be time intensive. During the curation process, the activity feed server may generate more events. Thus, the activity feed server may be in tension between providing the user a personalized experience while providing the user a timely experience. The activity feed server may ameliorate this by generating both a recent event list and a curated event list. The activity feed server may then combine these lists into a single event list. The event list may present the recent event list before the curated event list, or may interleave the recent event list with the curated event list.

Further, certain curated events may be given precedence over the recent events based on the event weight and focus weight. Thus, the activity feed server may update the interaction rates of any of the older events and properly rank the items in a single unified manner. The activity feed server may still promote recent events while not being strictly chronological. For example, an older file with a history of access used by everyone may be more important than a recently created file that is likely empty. The activity feed server may use the event weight of an event and the focus weight of the associated object to determine a predicted likelihood of interaction between the user and the event.

FIG. 1 illustrates, in a block diagram, one example of a data network 100. A client device 110 operated by a user may access a virtual collaboration space 120 via a data network connection 130 to work on a project. The client device 110 may be a desktop computer, a workstation, a smart phone, a tablet, a smart watch, or other computing device capable of interacting with the virtual collaboration space 120. The virtual collaboration space 120 may be hosted on a server or server farm. The data network connection 130 may be an enterprise network connection, an internet connection, a wide area network connection, a local area network connection, a mobile telephone network, or other type of data network connection. A project may be a product specific task, a corporate function task, or some other goal or routine worked on by an enterprise group.

The client device 110 may execute a general use application 112 to interact with the virtual collaboration space 120 as a web site, such as a browser. Alternately, the client device 110 may execute a dedicated application 112 to access the virtual collaboration space. Additionally, the client device 110 may have a plug-in for a secondary application, such as a word processing document, to allow a file produced by the secondary application to be directly loaded into the virtual collaboration space 120. The virtual collaboration space 120 may have a network storage space 122, either localized to a specific server or distributed across multiple servers, to store files for use in a project. A virtual collaboration space 120 may be dedicated to a specific project or a specific team. Alternately, the virtual collaboration space 120 may have partitions for several different projects or teams.

The client device 110 may execute an administrative assistant application suite 114 in furtherance of the project. For example, the client device 110 may connect to a support service 140 via the data network connection 130. The support service 140 may be hosted on a server or server farm. The administrative assistant application suite 114 may connect to a calendar back end service 142 at the support service 140. The calendar back end service 142 allows a user to share the schedule of the user to other users. Further, the client device 110 may execute a communication application 116 to connect to a mail back end service 144 or a communication back end service 146 at a support service 140. The mail back end service 144 provides email capability to the client device 110. The communication back end service 146 may allow the user to chat, video chat, video conference, or perform other real time communication activities.

The data network 100 may have a separate activity feed server 150 to keep a user current on any changes to the project. Alternately, the activity feed server 150 may be implemented as part of the virtual collaboration space 120 or the support service 140. The activity feed server 150 may execute a feed aggregator module 152 to monitor the virtual collaboration space 120 to identify any activity performed in relation to the project. For example, the feed aggregator module 152 may identify a new file being added to the network storage space 122 in the virtual collaboration space, a user editing an existing file, or even a user just accessing an existing file. The feed aggregator module 152 may generate an event 154 describing this activity. The feed aggregator module 152 may associate the project with a group identifier. Thereafter, the feed aggregator module 152 may identify any file or user explicitly associated with that group identifier as performing an activity as part of the project. The feed aggregator module 152 may use a machine-learning module to implicitly identify a group member or product. For example, if a threshold number of known group members access a file, the feed aggregator module 152 may consider the file a group product. Additionally, the feed aggregator module 152 may identify an associated group identifier in an associated network service. For example, for email purposes, the project may have a user group or hashtag on the mail back end service 142 that is equivalent to the group identifier used for the project in the virtual collaboration space 120. The feed aggregator module 152 may retrieve these email items associated with the user group and generate an event 154.

The activity feed server 150 may post an activity feed 124 with the identified events 126 to the virtual collaboration space 120, or to one of the support services 140. The client device 110 may then implement the virtual collaboration space application 112 or one of the other applications to download and read the activity feed 124. Alternately, the client device may have a dedicated activity feed reader module 118. Thus, a user may be kept aware of any changes to the status of a project or an aspect of the project.

Figure 2:
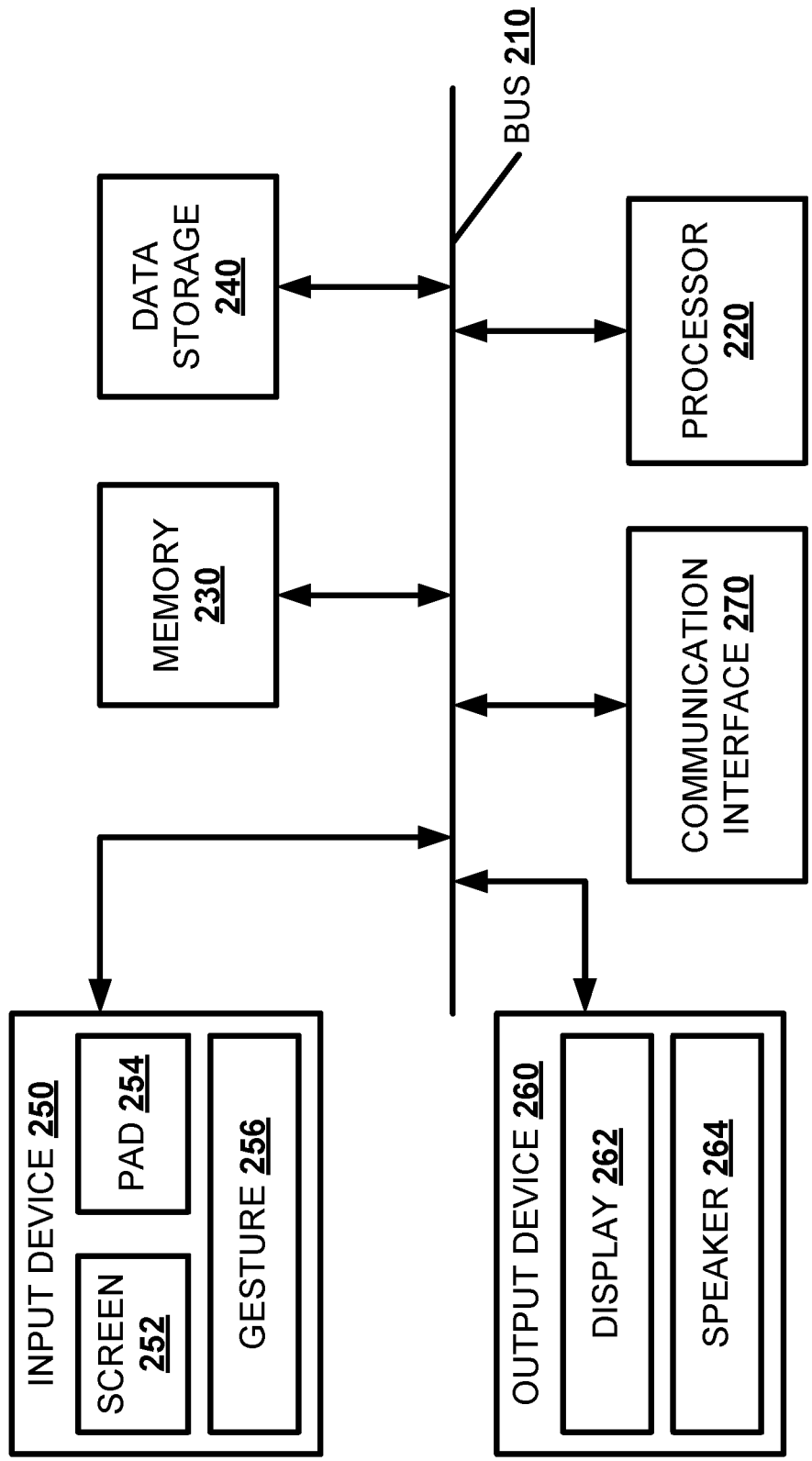
FIG. 2 illustrates, in a block diagram, one example of a computing device.

FIG. 2 illustrates a block diagram of an exemplary computing device 200 which may act as a client device or an activity feed server. The computing device 200 may combine one or more of hardware, software, firmware, and system-on-a-chip technology to implement a client device or an activity feed server. The computing device 200 may include a bus 210, a processing core 220, a memory 230, a data storage 240, an input device 250, an output device 260, and a communication interface 270. The bus 210, or other component interconnection, may permit communication among the components of the computing device 200.

The processing core 220 may include at least one conventional processor or microprocessor that interprets and executes a set of instructions. The processing core 220 may be configured to generate an event based on a file at the virtual collaboration space. The processing core 220 may identify an associated network service used in support of a project. The processing core 220 may match a group identifier for the project in the virtual collaboration space to an associated group identifier for the project in an associated network service. The processing core 220 may add an associated event set from an associated network service to the event list prior to ranking.

The processing core 220 may rank a mature event set from an event set of events older than a period matching a processing delay based on a relevance weighting for a user to generate a curated event list. The processing core 220 may categorize an event into an event subject based on an event type for an associated file. The processing core 220 may apply an event weight to an event based on an event subject. The processing core 220 may assign a focus weight to an associated file based on a user interaction with the associated file. The processing core 220 may factor at least one of an event weight and a focus weight for an event in to ranking the curated event set. The processing core 220 may age a curated event out of the curated event list.

The processing core 220 may queue a recent event set of events younger than the processing delay in chronological order to generate a recent event list. The processing core 220 may generate an event list having the curated event list and the recent event list. The processing core 220 may interleave the curated event list and the recent event list, promoting certain events in the curated event list having a sufficient event weight based on an analytic review above a recent event from the recent event list. The processing core 220 may match a curated event to a recent event. The processing core 220 may remove a curated event from the curated event set if the curated event matches a recent event. The processing core 220 may promote an event in the recent event set based on a focus weight of an associated file. The processing core 220 may adjust a position of a curated event in the curated event list in relation to a recent event on the recent event list based on a predicted interaction likelihood. The processing core 220 may promote a curated event having an event weight over a promotion threshold above the recent event list in the event list.

The memory 230 may be a random access memory (RAM) or another type of dynamic data storage that stores information and instructions for execution by the processing core 220. The memory 230 may also store temporary variables or other intermediate information used during execution of instructions by the processing core 220. The memory 230 may be configured to store an event set describing activities related to a project. The memory 230 may maintain a user profile describing a user position within a project. The memory 230 may associate the project with a group identifier.

The data storage 240 may include a conventional ROM device or another type of static data storage that stores static information and instructions for the processing core 220. The data storage 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 240 may store a set of instructions detailing a method that when executed by one or more processors cause the one or more processors to perform the method. The data storage 240 may also be a database or a database interface for storing events.

The input device 250 may include one or more conventional mechanisms that permit a user to input information to the computing device 200, such as a keyboard, a mouse, a voice recognition device, a microphone, a headset, a touch screen 252, a touch pad 254, a gesture recognition device 256, etc. The input device 250 may be configured to receive a user input indicating a user interaction with an event in the event set. The output device 260 may include one or more conventional mechanisms that output information to the user, including a display screen 262, a touch screen 252, a printer, one or more speakers 264, a headset, a vibrator, or a medium, such as a memory, or a magnetic or optical disk and a corresponding disk drive.

The communication interface 270 may include any transceiver-like mechanism that enables computing device 200 to communicate with other devices or networks. The communication interface 270 may include a network interface or a transceiver interface. The communication interface 270 may be a wireless, wired, or optical interface. The communication interface 270 may be configured to send the activity feed having the event list to a client device for presentation to the user. The communication interface 270 may retrieve an associated event set from an associated network service for addition to the event set.

The computing device 200 may perform such functions in response to processing core 220 executing sequences of instructions contained in a computer-readable medium, such as, for example, the memory 230, a magnetic disk, or an optical disk. Such instructions may be read into the memory 230 from another computer-readable medium, such as the data storage 240, or from a separate device via the communication interface 260.

Figure 3:
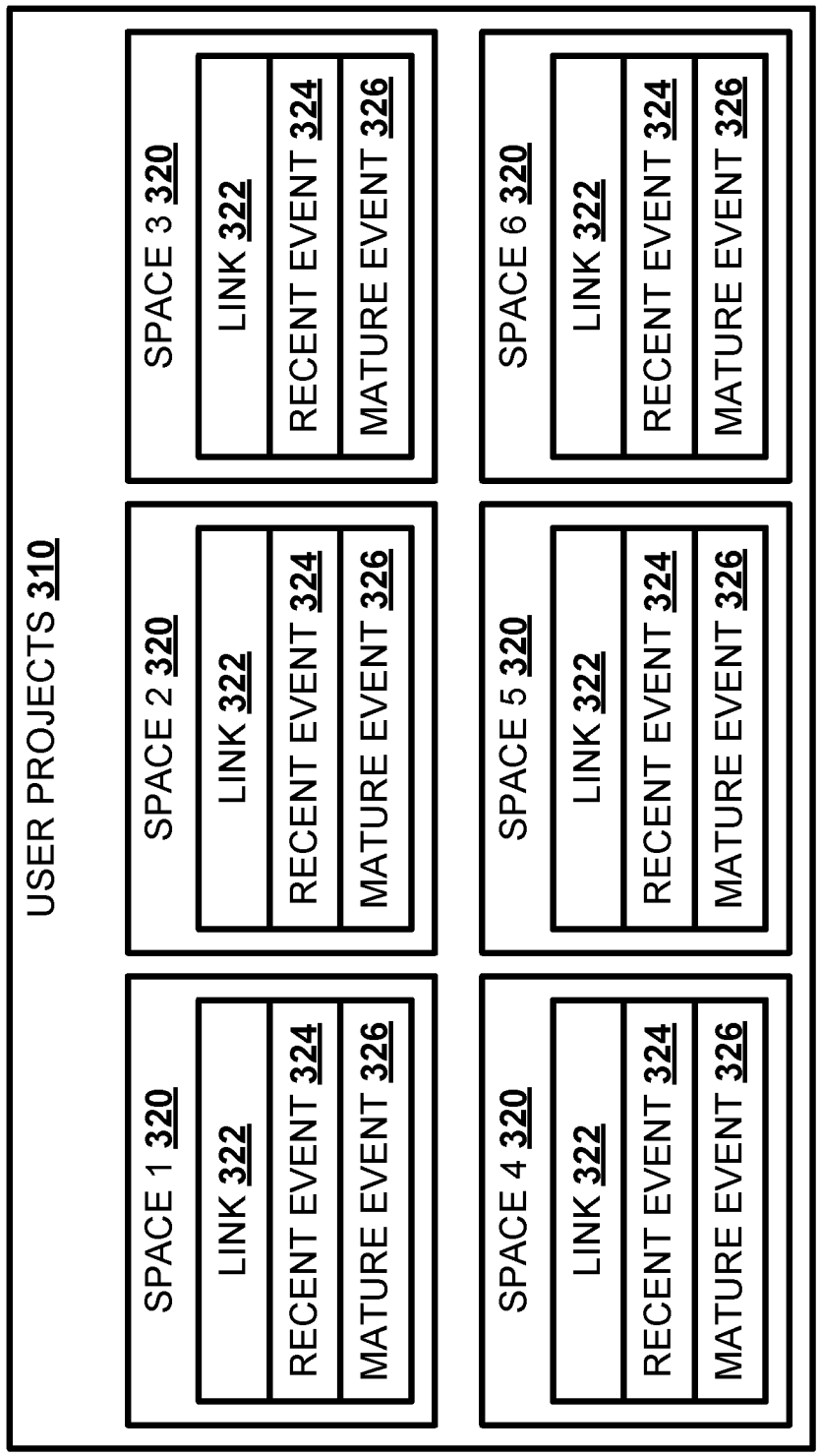
FIG. 3 illustrates, in a block diagram, one example of a user view for the user interface.

A user may access an activity feed using a virtual collaboration space application, such as a browser, or a dedicated activity feed reader. FIG. 3 illustrates, in a block diagram, one example of a user view 300 for the user interface. The user view 300 may present in a single view a user project set 310 for that user. The user project set 310 may represent each project with an associated virtual collaboration space container 320. The associated virtual collaboration space container 320 may have a link 322 to the virtual collaboration space for the project.

The virtual collaboration space container 320 may provide a preview of the activity feed for that virtual collaboration space. The activity feed preview may provide one or more recent events 324, representing events received within a processing period prior to presentation based on the processing delay. The activity feed preview may give preference to newer recent events 324 over older recent events. The activity feed preview may provide one or more mature events 326, representing events received prior to the processing period. The activity feed preview may give preference to mature events 326 that more closely match a user profile for the user.

Figure 4:
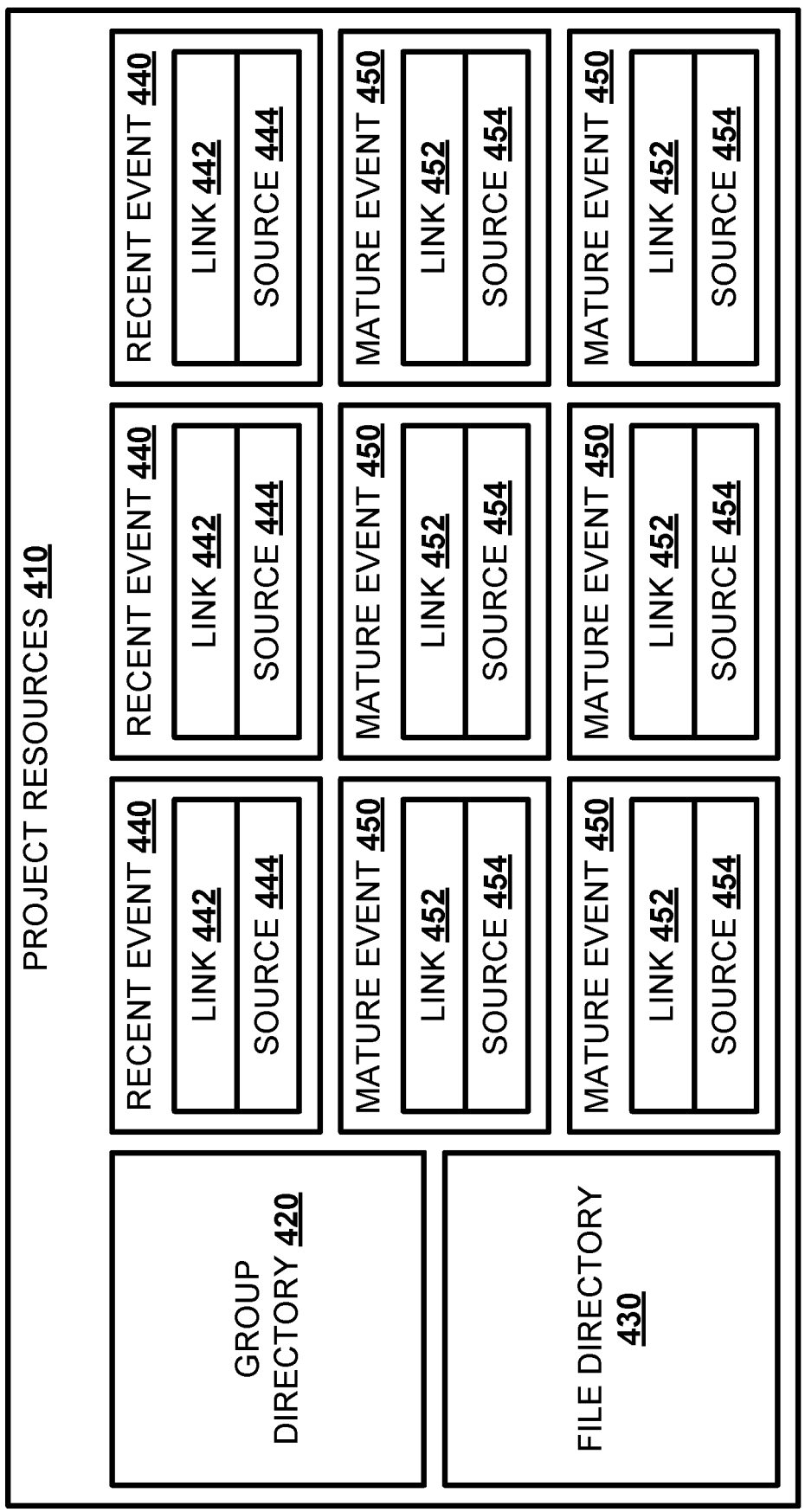
FIG. 4 illustrates, in a block diagram, one example of a virtual collaboration space view for the user interface.

Once a user has selected a link to the virtual collaboration space, a virtual collaboration space application may show a virtual collaboration space view. FIG. 4 illustrates, in a block diagram, one example of a virtual collaboration space view 400 for the user interface. The virtual collaboration space view 400 may provide a project resource listing 410 describing different aspects of the project. The project resource listing 410 may display a group directory 420 listing members of the group with access to the virtual collaboration space. The project resource listing 410 may display a file directory 430 listing files stored in the virtual collaboration space.

The project resource listing 410 may display an activity feed listing events of interest for the user. The activity feed may present a set of one or more recent event containers 440. The recent event container 440 may represent an event so close in time to presentation that the activity feed server has been unable to properly curate the event. The recent event container 440 may have a link 442 to the data object that is the subject of the event. The data object may be a file, an email, a calendar event, or other data object. The recent event container 440 may have a source identifier 444 describing the application service providing the event, such as the virtual collaboration space, the mail back-end service, the calendar back-end service, or a communication back-end service.

The activity feed may present a set of one or more mature event containers 450. The mature event container 450 may represent an event received with sufficient time to properly curate the event. The mature event container 450 may have a link 452 to the data object that is the subject of the event. The data object may be a file, an email, a calendar event, or other data object. The mature event container 450 may have a source identifier 454 describing the application service providing the event, such as the virtual collaboration space, the mail back-end service, the calendar back-end service, or a communication back-end service.

The activity feed server may compare the recent event set to the mature event set to remove any overlap. The activity feed may have the recent events listed separately from mature events, or may interleave recent events with mature events. The activity feed may promote certain mature events having a sufficient event weight and focus weight above recent events. The activity feed may group events by source. For example, the activity feed may group email events with email events and calendar events with calendar events. The activity feed may place an upper bound on recent events, so just a set number of recent events, such as ten, are shown to the user to prevent recent events from overwhelming curated events.

The activity feed server may maintain a user profile for each user to aid in determining the events most of interest to the user. FIG. 5 illustrates, in a block diagram, one example of a user profile 500. The user profile 500 may have a user identifier (ID) 510 indicating the user referenced by the user profile 500. The user profile 500 may have a position field 520 describing the position of the user within the enterprise. The user profile 500 may have a report structure field 530 describing both who the user reports to and who reports to the user. The user profile 500 may have a project field 540 describing any projects associated with the user. The user profile 500 may have a file history array 550 identifying each file that the user has accessed. The file history array 550 may list a file identifier 552, a timestamp 554 of the most recent access, and the type 556 of access performed, such as create, modify, or delete.

The activity feed server may maintain a file metadata profile for each file stored at the virtual collaboration space, to be used in calibrating any associated events. FIG. 6 illustrates, in a block diagram, one example of a file metadata profile 600. The file metadata profile 600 may have a document identifier 610 indicating the file referenced. The file metadata profile 600 may have group identifier 620 indicating the group associated with the file. The file metadata profile 600 may have a subject vector 630 describing the subject matter of the file.

The file metadata profile 600 may have an access history. The access history may have an author field 640 identifying the user that uploaded the file to the virtual collaboration space. The author field 640 may have an associated timestamp 642 indicating when the file was uploaded. The access history may have an edit array 650 indicating each time that file was edited. The edit array 650 may have an edit identifier 652 describing an edit to the file. The edit array 650 may have an editor identifier 654 indicating the user that edited the file. The edit array 650 may have an associated timestamp 656 indicating when the file was edited. The access history may have a view array 660 indicating each time that file was viewed. The view array 660 may have a viewer identifier 662 indicating the user that viewed the file. The edit array 660 may have an associated timestamp 664 indicating when the file was viewed.

Figure 7:
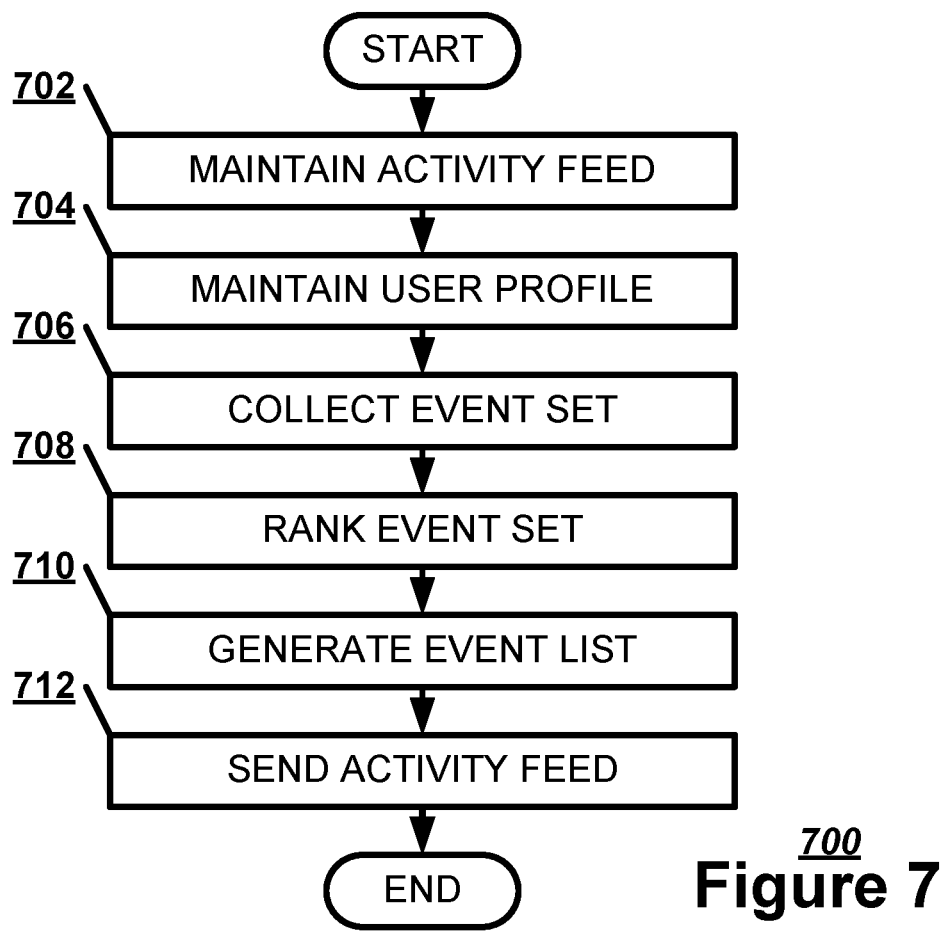
FIG. 7 illustrates, in a flowchart, one example of a method for generating an activity feed at the activity feed server.

FIG. 7 illustrates, in a flowchart, one example of a method 700 for generating an activity feed at the activity feed server. The activity feed server may maintain, for a virtual collaboration space for a project accessibly by a user, an activity feed listing events describing activities related to the project for access by the user (Block 702). The activity feed server may maintain a user profile describing a user position within the project (Block 704). The activity feed server may collect an event set related to the project (Block 706). The activity feed server may rank the event set based on a relevance weighting for the user to generate an event list (Block 708). The activity feed server may generate the event list for presentation to a user (Block 710). The activity feed server may send the activity feed having the event list to a client device for presentation to the user (Block 712).

Figure 8:
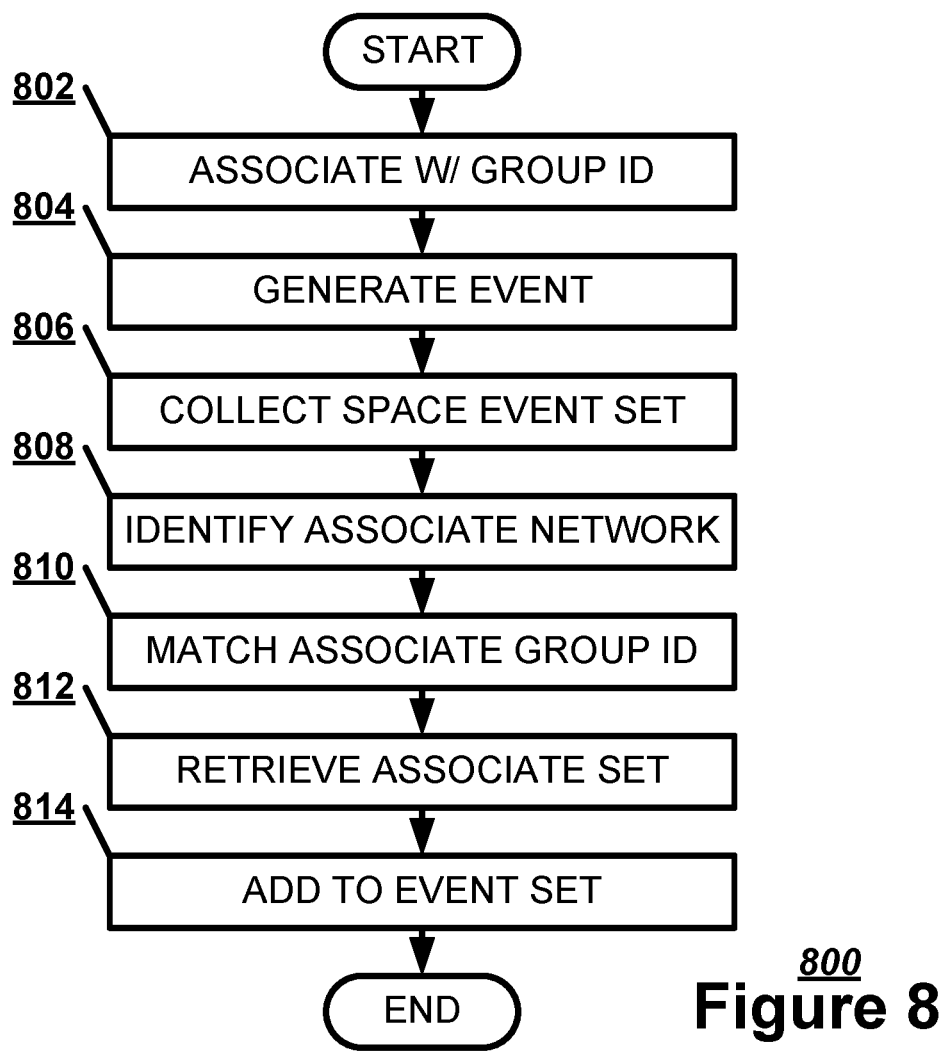
FIG. 8 illustrates, in a flowchart, one example of a method for collecting events at the activity feed server.

FIG. 8 illustrates, in a flowchart, one example of a method 800 for collecting events at the activity feed server. The activity feed server may associate a project with a group identifier (Block 802). The activity feed server may generate an event based on a file at the virtual collaboration space (Block 804). The activity feed server may collect a collaboration space event set from the virtual collaboration space for an event set related to the project (Block 806). The activity feed server may identify an associated network service used in support of the project (Block 808). The activity feed server may match a group identifier for the project in the virtual collaboration space to an associated group identifier for the project in an associated network service (Block 810). The activity feed server may retrieve an associated event set from the associated network service for addition to the event set (Block 812). The activity feed server may add the associated event set from the associated network service to the event set prior to ranking (Block 814).

Figure 9:
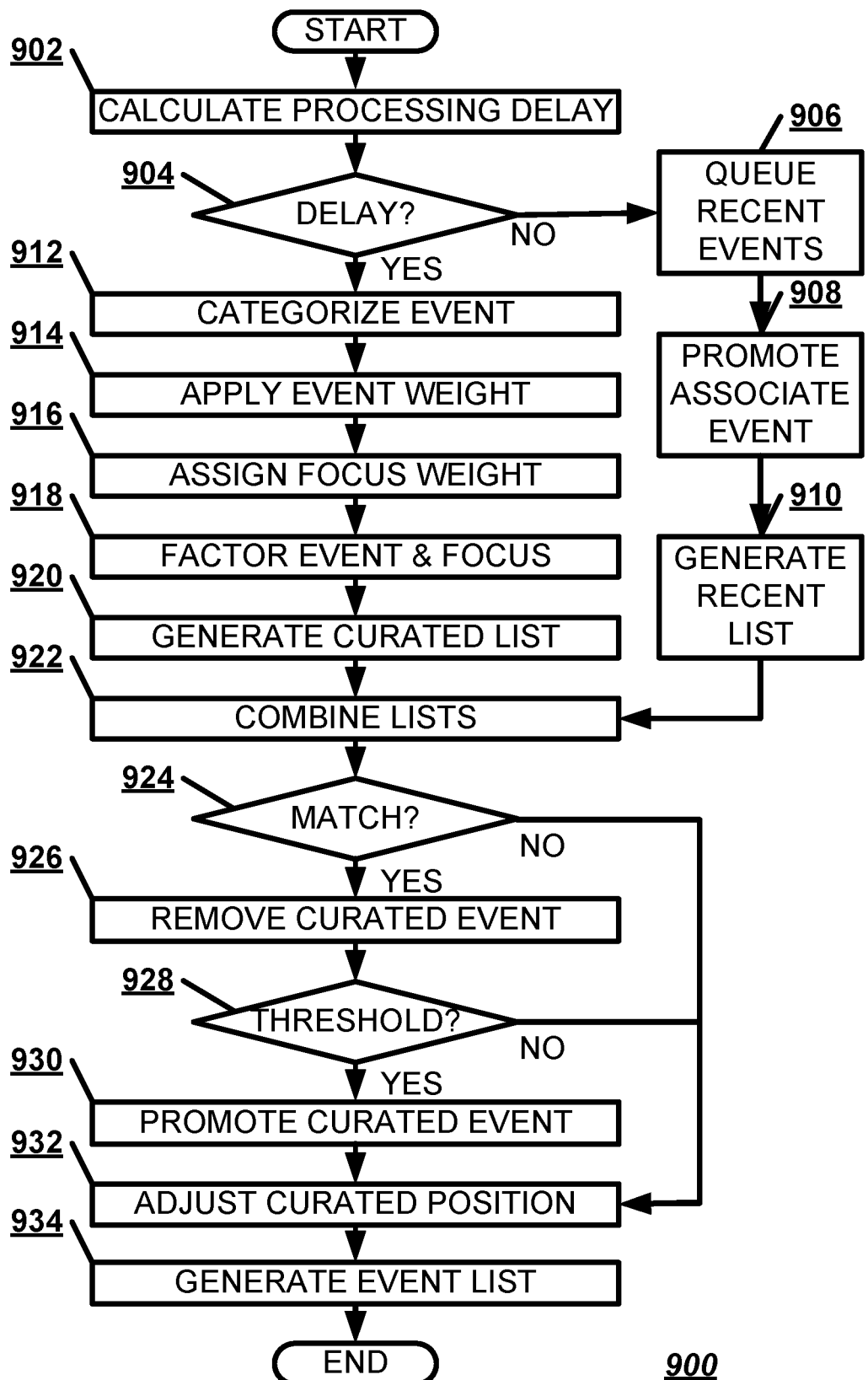
FIG. 9 illustrates, in a flowchart, one example of a method for organizing events at the activity feed server.

FIG. 9 illustrates, in a flowchart, one example of a method 900 for organizing events at the activity feed server. The activity feed server may calculate a processing delay for curating an activity feed (Block 902). If an event was generated within a period matching the processing delay (Block 904), the activity feed server may queue a recent event set of events younger than the processing delay in chronological order to generate a recent event list (Block 906). The activity feed server may promote an event in the recent event set based on a focus weight of an associated file (Block 908). The activity feed server may generate a recent event list (Block 910).

If an event was generated prior to a period matching the processing delay (Block 904), the activity feed server may categorize an event into an event subject based on an event type for an associated file (Block 912). The activity feed server may apply an event weight to an event based on an event subject (Block 914). The activity feed server may assign a focus weight to an associated file based on a user interaction with the associated file (Block 916). The activity feed server may factor at least one of an event weight and a focus weight for an event in to ranking the curated event set (Block 918). The activity feed server may rank a mature event set from the event set of events older than a period matching a processing delay based on the relevance weighting for the user to generate a curated event list as part of the event list (Block 920).

The activity feed server may combine the recent event list and the curated event list (Block 922). If a subject matter of a curated event matches a subject matter of a recent event (Block 924), the activity feed server may remove a curated event from the curated event set if the curated event matches a recent event (Block 926). If a predicted interaction likelihood of a curated event surpasses a promotion threshold (Block 928), the activity feed server may promote a curated event having an event weight over a promotion threshold above the recent event list in the event list (Block 930). The activity feed server may adjust a position of a curated event in the curated event list in relation to a recent event on the recent event list based on an predicted interaction likelihood (Block 932). The activity feed server may generate an event list having the curated event list and the recent event list (Block 934).

FIG. 10 illustrates, in a flowchart, one example of a method 1000 for presenting an activity feed at the client device. The client device may provide a user credential to the virtual collaboration space (Block 1002). The client device may receive authentication from the virtual collaboration space (Block 1004). The client device may access the virtual collaboration space (Block 1006). The client device may send an activity feed request to the virtual collaboration space (Block 1008). The client device may receive an activity feed from the virtual collaboration space (Block 1010). The client device may present the activity feed from the virtual collaboration space (Block 1012).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Examples within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to store desired program code means in the form of computer-executable instructions or data structures, as opposed to propagating media such as a signal or carrier wave. Computer-readable storage media explicitly does not refer to such propagating media. Combinations of the above should also be included within the scope of the computer-readable storage media.

Examples may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described examples are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. An activity feed system, comprising:
   a collaboration space server comprising:
      a memory configured to store an event set describing activities related to a project;
      a processing core having at least one processor configured to perform operations comprising:
         maintaining, by the collaboration space server, an activity feed based on a virtual collaboration space for the project;
         collecting, by the collaboration space server, a collaboration space event set from the virtual collaboration space for the event set related to the project;
         forming, by the collaboration space server, a first group of activities and a second group of activities from the event set, the first group comprising a mature event set, the second group of activities comprising a recent event set, the mature event set comprising events older than a processing delay;
         applying, by the collaboration space server, an event weight and a focus weight to events to the first group of activities, the focus weight applied to a corresponding file based on a user interaction with the corresponding file;
         ranking, by the collaboration space server, from the first group of activities, events based on a relevance weighting for a user to generate a curated event list, the relevance weighting based on the event weight and the focus weight;
         queuing, by the collaboration space server, from the second group of activities, events that are younger than the processing delay in chronological order to generate a recent event list; and
         generating an event list having the curated event list and the recent event list; and
      a communication interface configured to transmit, over a computer network, the curated event list and the recent event list to a client device, the client device configured to display, in a graphical user interface, one or more event from the curated event list and one or more event from the receive event list.

2. The activity feed server of claim 1, wherein the processing core is configured to match a group identifier for the project in the virtual collaboration space to an associated group identifier for the project in an associated network service.

3. The activity feed server of claim 1, wherein the communication interface is configured to retrieve an associated event set from an associated network service for addition to the event set.

4. The activity feed server of claim 1, wherein the processing core is configured to add an associated event set from an associated network service to the event list prior to ranking.

5. The activity feed server of claim 1, wherein the processing core is configured to categorize an event into an event subject based on an event type for an associated file.

6. The activity feed server of claim 1, wherein the processing core is configured to apply an event weight to an event based on an event subject.

7. The activity feed server of claim 1, wherein the processing core is configured to assign a focus weight to an associated file based on a user interaction with the associated file.

8. The activity feed server of claim 1, wherein the processing core is configured to factor at least one of an event weight and a focus weight for an event in to ranking the curated event set.

9. The activity feed server of claim 1, wherein the processing core is configured to age a curated event out of the curated event list.

10. The activity feed server of claim 1, wherein the processing core is configured to adjust a position of a curated event in the curated event list in relation to a recent event on the recent event list based on a predicted interaction likelihood.

11. The activity feed server of claim 1, wherein the processing core is configured to promote a curated event having an event weight over a promotion threshold above the recent event list in the event list.

12. The activity feed server of claim 1, wherein the processing core is configured to remove a curated event from the curated event set if the curated event matches a recent event.

13. A computing device, having a memory to store a series of instructions that are executed by at least one processor to implement an activity feed listing events describing activities related to a project, the computing device configured to perform operations comprising:
  maintaining an activity feed based on a virtual collaboration space for the project with access by the user, the virtual collaboration space being operated by a collaboration space server;
  collecting a collaboration space event set from the virtual collaboration space for an event set related to the project;
  identifying an associated network service used in support of the project;
  retrieving an associated event set from the associated network service;
  adding the associated event set to the event set;
  forming a first group of activities and a second group of activities from the activities related to the project, the first group comprising a mature event set, the second group of activities comprising a recent event set, the mature event set comprising events older than a processing delay;
  applying an event weight and a focus weight to events in the first group of activities, the focus weight applied to a corresponding file based on a user interaction with the corresponding file;
  ranking the event set based on a relevance weighting for the user to generate a curated event list, the relevance weighting based on the event weight and the focus weight; and
  transmitting, over a computer network, one or more events from the curated event list and one or more events from the recent event list to a client device, the client device configured to display, in a graphical user interface, the one or more events from the curated event list and the one or more events from the recent event list.

14. The computing device of claim 13, wherein the computing device is further configured to
  generate an event based on a file at the virtual collaboration space.

15. The computing device of claim 13, wherein the computing device is further configured to
  maintain a user profile describing a user position within the project.

16. The computing device of claim 13, wherein the computing device is further configured to
  associate the project with a group identifier.

17. The computing device of claim 13, wherein the computing device is further configured to
  match a group identifier for the project in the virtual collaboration space to an associated group identifier for the project in an associated network service.

18. The computing device of claim 13, wherein the computing device is further configured to
  rank the mature event set from the event set of events older than a period matching a processing delay based on the relevance weighting for the user to generate the curated event list as part of the event list.

19. A machine-implemented method, comprising:
  storing, at a collaboration space server, an event set describing activities related to a project;
  maintaining, by the collaboration space server, an activity feed based on a virtual collaboration space for the project;
  collecting, by the collaboration space server, a collaboration space event set from the virtual collaboration space for the event set related to the project;
  forming, by the collaboration space server, a first group of activities and a second group of activities from the event set, the first group comprising a mature event set, the second group of activities comprising a recent event set, the mature event set comprising events older than a processing delay;
  applying, by the collaboration space server, an event weight and a focus weight to events to the first group of activities, the focus weight applied to a corresponding file based on a user interaction with the corresponding file;
  ranking, by the collaboration space server, from the first group of activities, events based on a relevance weighting for a user to generate a curated event list, the relevance weighting based on the event weight and the focus weight;
  queuing, by the collaboration space server, from the second group of activities, events that are younger than the processing delay in chronological order to generate a recent event list; and
  generating an event list having the curated event list and the recent event list; and
  transmitting, over a computer network, the curated event list and the recent event list to a client device, the client device configured to display, in a graphical user interface, one or more event from the curated event list and one or more event from the receive event list.

20. The method of claim 19, further comprising:
  matching a group identifier for the project in the virtual collaboration space to an associated group identifier for the project in an associated network service;
  retrieving an associated event set from the associated network service for addition to the event set; and
  adding the associated event set from the associated network service to the event list prior to ranking.

* * * * *